United States Patent
Amaral Cunha de Assis et al.

(10) Patent No.: US 12,056,656 B1
(45) Date of Patent: Aug. 6, 2024

(54) MULTI-CARRIER SHIPPING INTERFACE

(71) Applicant: POPOUT, INC., San Francisco, CA (US)

(72) Inventors: Lucas Amaral Cunha de Assis, San Francisco, CA (US); Sin-Mei Tsai, San Francisco, CA (US); Gavin Butler, San Francisco, CA (US); Benjamin A. Emmrich, San Francisco, CA (US); Simon Kreuz, San Francisco, CA (US)

(73) Assignee: POPOUT, INC., San Francisco, CA (US)

( * ) Notice: Subject to any disclaimer, the term of this patent is extended or adjusted under 35 U.S.C. 154(b) by 262 days.

(21) Appl. No.: 16/695,003

(22) Filed: Nov. 25, 2019

(51) Int. Cl.
| | | |
|---|---|---|
| *G06Q 10/083* | (2024.01) | |
| *G06F 16/23* | (2019.01) | |
| *G06F 16/25* | (2019.01) | |
| *G06Q 10/0833* | (2023.01) | |
| *G06Q 10/0834* | (2023.01) | |

(52) U.S. Cl.
CPC ...... *G06Q 10/0838* (2013.01); *G06F 16/2365* (2019.01); *G06F 16/258* (2019.01); *G06Q 10/0833* (2013.01); *G06Q 10/08345* (2013.01)

(58) Field of Classification Search
CPC ........... G06Q 10/0833; G06Q 10/0838; G06Q 10/08345; G06F 16/2365; G06F 16/258
USPC ....................................................... 705/335
See application file for complete search history.

(56) References Cited

U.S. PATENT DOCUMENTS

| | | | | |
|---|---|---|---|---|
| 10,395,293 | B1* | 8/2019 | Mangtani | ............... G06Q 20/12 |
| 11,321,661 | B1* | 5/2022 | Winship, Sr. | ...... G01C 21/3605 |
| 2005/0259658 | A1* | 11/2005 | Logan | ................... H04L 67/306 |
| | | | | 370/392 |
| 2013/0254132 | A1* | 9/2013 | Srinath | .............. G06Q 10/0834 |
| | | | | 705/334 |
| 2014/0052617 | A1* | 2/2014 | Chawla | ................ G06Q 20/102 |
| | | | | 705/39 |
| 2014/0279657 | A1* | 9/2014 | Stowe | .............. G06Q 10/08345 |
| | | | | 705/335 |

(Continued)

FOREIGN PATENT DOCUMENTS

WO      WO-0057258 A2 * 9/2000 ............. G06Q 30/02

OTHER PUBLICATIONS

Easypost API Docs. https://web.archive.org/web/20180624210935/https://www.easypost.com/docs/api#addresses (Year: 2018).*

*Primary Examiner* — Shannon S Campbell
*Assistant Examiner* — Lisa Ma
(74) *Attorney, Agent, or Firm* — Van Pelt, Yi & James LLP

(57) ABSTRACT

A response object is received from a carrier that includes a shipment identifier that identifies a shipment uniquely and globally within a multi-carrier shipping service domain. A response object type of the response object is determined. The response object is validated, including by determining whether the response object is formatted in a manner associated with the response object type and includes one or more required values associated with the response object type. A shipping event related operation is performed using data comprising the response object based at least in part on a determination that the response object is formatted in the manner associated with the response object type and includes one or more required values associated with the response object type.

26 Claims, 5 Drawing Sheets

(56) References Cited

U.S. PATENT DOCUMENTS

| | | | |
|---|---|---|---|
| 2014/0337246 A1* | 11/2014 | Williams | G06Q 30/0601 |
| | | | 705/336 |
| 2017/0026339 A1* | 1/2017 | Degenkolb | H04L 63/08 |
| 2017/0154347 A1* | 6/2017 | Bateman | G06Q 10/0838 |
| 2018/0137512 A1* | 5/2018 | Georgiadis | H04L 63/08 |
| 2018/0165642 A1* | 6/2018 | Krieg | G06F 9/44 |
| 2018/0276728 A1* | 9/2018 | Psota | G06Q 10/08 |
| 2018/0349849 A1* | 12/2018 | Jones | G06Q 30/0611 |
| 2021/0012285 A1* | 1/2021 | Marlowe | G06Q 30/0201 |

\* cited by examiner

MULTI-CARRIER SHIPPING INTERFACE

BACKGROUND OF THE INVENTION

Shipping physical items is an essential part of many businesses. Shipping efficiently involves comparing multiple carriers, each of whom may ship a given physical item under differing service levels and rates. There exists a need for making shipping simpler and more efficient.

BRIEF DESCRIPTION OF THE DRAWINGS

Various embodiments of the invention are disclosed in the following detailed description and the accompanying drawings.

DETAILED DESCRIPTION

Figure 1:
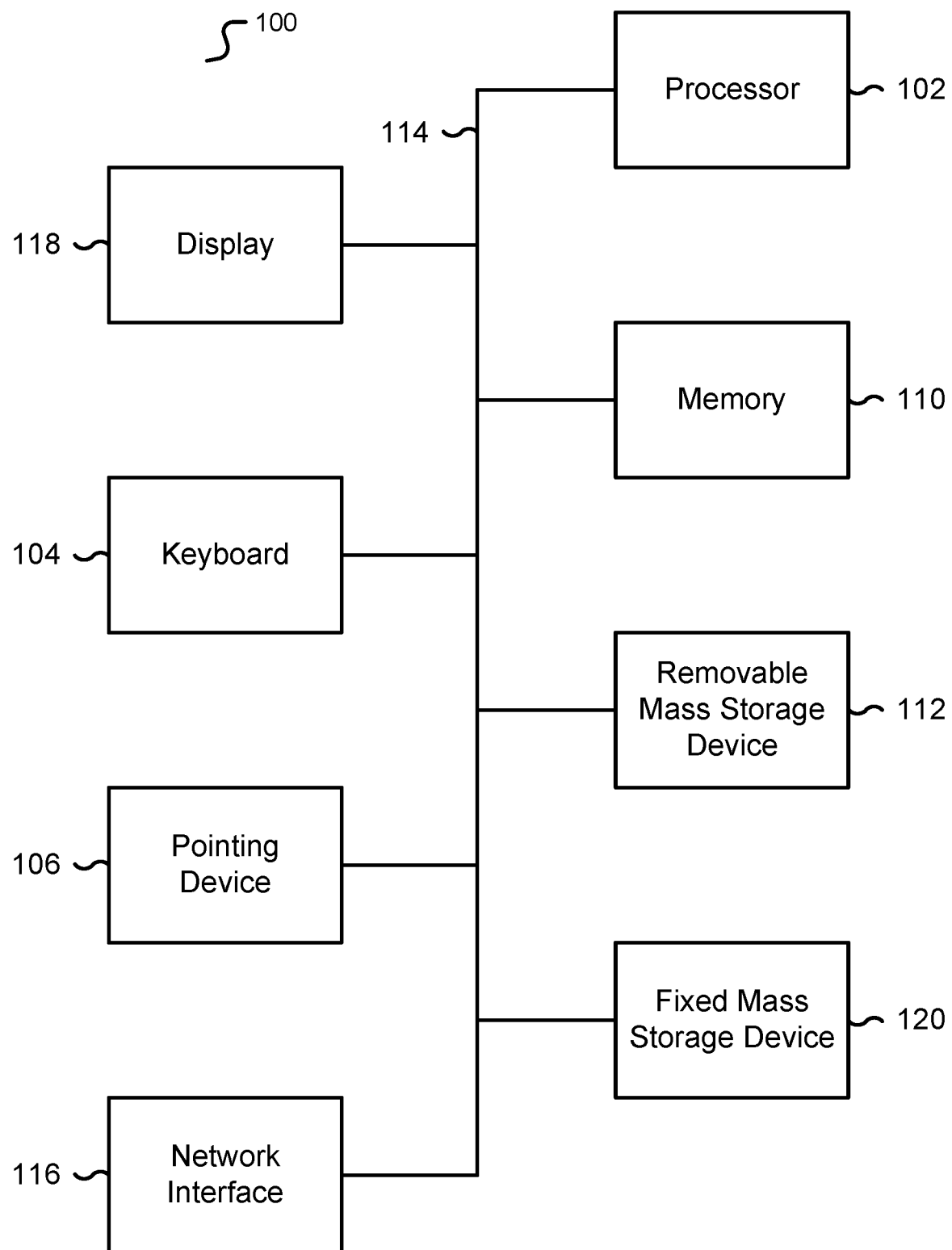
FIG. 1 is a functional diagram illustrating a programmed computer/server system for a multi-carrier shipping interface in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A multi-carrier shipping interface is disclosed. A carrier integrating with a multi-carrier shipping interface may service specific geographic regions, such as the United States West Coast and cross-border from the United States to Canada, or globally.

Different carriers may run their shipping business in different ways. Due to history and/or capability they may differ in their customer facing interface. This difference in each carrier's interface makes it challenging to provide shipping services across a multitude of carriers as for each carrier, carrier-specific logic must be developed. Between any carrier, rates for a given "package" may differ. As referred to herein, a package is any physical item to be shipped including a document, envelope, currency, and parcel.

In some instances, a national carrier may not be the most efficient carrier when a regional carrier is available for regional shipping. For example, a California based regional carrier that optimizes California to California routes may be more competitive for many packages than a national carrier. The disclosed multi-carrier shipping interface is a simple application programming interface (API) that permits any carrier to easily participate with an integrator for shipping use cases by providing a canonical framework for a carrier shipment. As referred to herein, a "canonical" framework is a common, at times reduced, feature set to be addressed by API.

FIG. 1 is a functional diagram illustrating a programmed computer/server system for a multi-carrier shipping interface in accordance with some embodiments. As shown, FIG. 1 provides a functional diagram of a general purpose computer system programmed to provide a multi-carrier shipping interface in accordance with some embodiments. As will be apparent, other computer system architectures and configurations may be used for a multi-carrier shipping interface.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2:
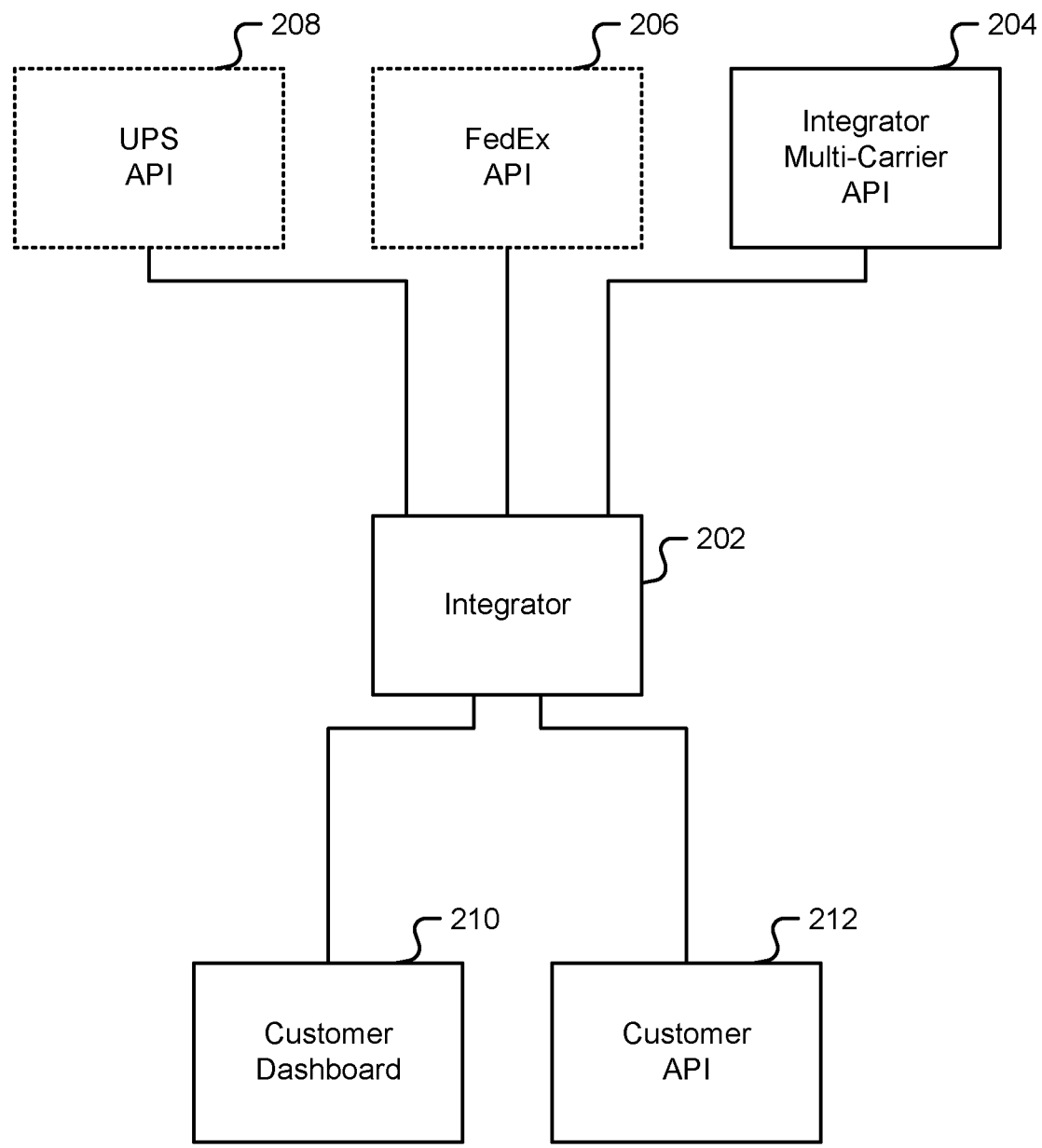
FIG. 2 is a block diagram illustrating an embodiment of a system for multi-carrier shipping.

FIG. 2 is a block diagram illustrating an embodiment of a system for multi-carrier shipping. In one embodiment, integrator (202) includes the system in FIG. 1.

An integrator (202), as referred to herein, is an entity who interfaces with a customer and brokers a plurality of carriers on a per shipment basis, based at least in part on comparing rates. Integrator (202) is coupled to one or more carriers via an integrator multi-carrier API (204). Integrator (202) may also be coupled to one or more carriers such as FedEx via their FedEx API (206) and/or UPS via their UPS API (208).

The integrator (202) is also coupled to a customer by, for example, a customer dashboard (210), a designed portal such as a web site that permits a user to manually or programmatically enter package details such as destination and package dimensions. Another way for an integrator (202) to be coupled to a customer is via an asynchronous or synchronous API (212) to permit a customer application/app/service to interface with the integrator (202) programmatically.

The multi-carrier API (204) is part of an integrator (202) framework to allow carriers and/or other logistics providers to offer their services to integrator customers (210, 212). An advantage for a carrier is growing their business with the integrator (202) and enhancing the customer experience for both integrator/carrier. To join the integrator (202) carrier network a given carrier integrates with the integrator framework, allowing the integrator to offer some or all of the carrier's services on other platforms such as the integrator customer dashboard (210) and API (212).

The benefits of this technique include for the carrier:
growing of business by acquiring new customers via the integrator (202);
enhancing customer experience by leveraging the integrator (202) platform. Customers benefit from a variety of integrator features, such as a developer-friendly API, an easy to use web app, tracking pages and more;
promotion of carrier brand with the integrator (202) to distinguish from competitors, and leverage co-marketing opportunities;

As motivation for a canonical multi-carrier API (204) over integration with multiple proprietary carrier APIs, the canonical API (204) is developer friendly, easy to use, minimizes the time for a carrier development team, and expedites integration with an integrator (202) platform.

Figure 3:
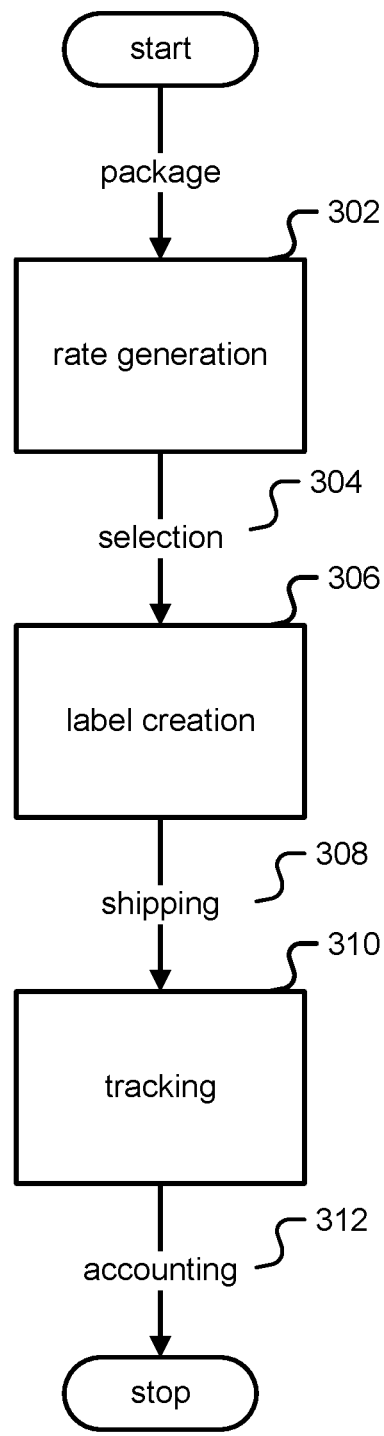
FIG. 3 is a flow chart illustrating a set of stages for shipping.

FIG. 3 is a flow chart illustrating a set of stages for shipping. In one embodiment, one or more of the stages of FIG. 3 are carried out by the system in FIG. 1 and/or the integrator (202) of FIG. 2.

For a given package for a given customer, in a first stage of rate generation (302) a rate is requested from one or more carriers. For each carrier, the multi-carrier API (204) is called. There may be different rates from one carrier depending on the customer account, service level, and so forth. One of the rates and corresponding carriers is selected (304) leading to a second stage of label creation (306). Label creation may be called using the multi-carrier API (204) or carrier-specific API (206, 208) of the selected carrier (304). The customer may then ship the product (308) and the integrator (202) may provide information on the third stage of tracking (310) either by a link to a carrier's website or by programmatically pulling the information from the selected carrier using an API like the multi-carrier API (204) or carrier-specific API (206,208). Optionally, accounting (312) may also be provided and/or pulled to the integrator (204).

In one embodiment, the integrator (202) allows for selected carriers a local implementation. This local implementation is based on an instant rate and/or instant label technique, wherein the integrator (202) locally calculates the applicable shipping rates and/or creates the requested shipping labels locally without necessarily requiring a near real-time connection to the carrier. An advantage of a local implementation is that a carrier does not then need to build rating and/or label integration on their side.

Framework Overview. The core of the integrator (202) carrier framework is the multi-carrier API (204). Whenever a customer requests a shipping rate, a shipping label, or a tracking update, the multi-carrier API (204) sends an API request to the carrier. The carrier is then responsible for returning the applicable rates, label and/or tracking update. This allows all customers to directly access all of a carrier's services in a unified manner.

Throughout this specification, an "object" refers without limitation to an API conforming request or response, for example an HTTP method such as a POST request, a GET request, and a PUT request. The notation used is that a "request" object is an object called to a carrier and a "response" object is an object received from a carrier. As referred to herein, an "object type" refers to a framework for an object, for example a schema of an object and/or a structure of an object including its fields, comprising element, type, description, and/or whether any fields are required.

Figure 4:
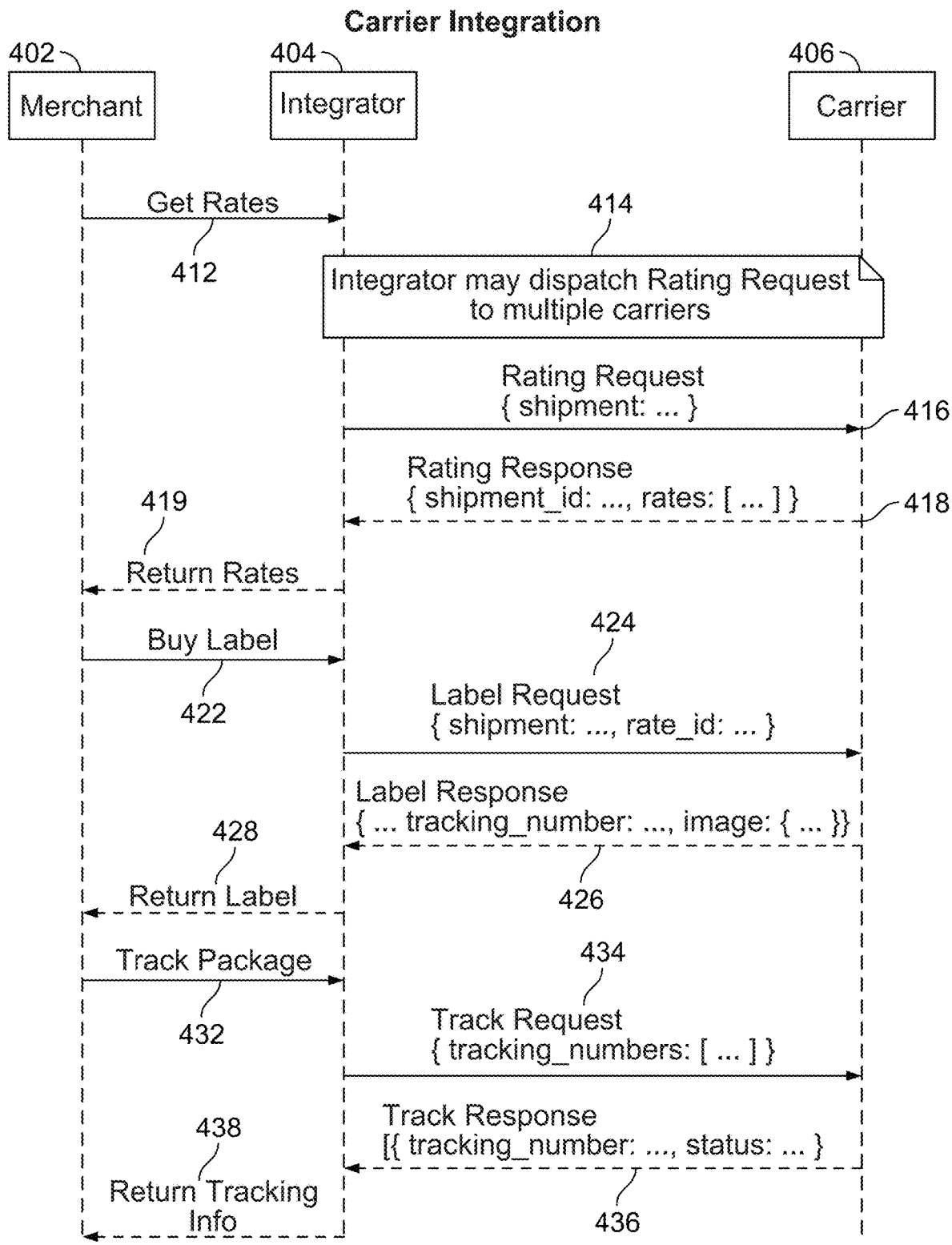
FIG. 4 is a sequence diagram outlining the relevant API calls for a multi-carrier shipment.

FIG. 4 is a sequence diagram outlining the relevant API calls for a multi-carrier shipment. The sequence diagram shows the calls between a customer called a "merchant" (402), the integrator (404), and the carrier (406). As shown in FIG. 4, the carrier (406) is responsible to implement one or more of the following endpoints: a rating service; a label service; and a tracking service.

Rate Generation (302). In sequence (412) the merchant (402) requests the integrator (404) to "Get Rate(s)". In response (414), integrator (404) may dispatch rating requests to multiple carriers (406). Each rating request (416) conforms to the multi-carrier API (204) and may include shipping details including at least one of the following: weight, dimensions, destination, and service level. The carrier (406) uses the multi-carrier API (204) to form a rating response (418) that includes at least one of the following: a shipment id and a set of rates, where the set may be empty if the carrier does not service said package. The integrator (404) then returns (419) zero, one or more rates to the merchant (402) for a selection (304).

Label Creation (306). In sequence (422) the merchant (402) requests the integrator (404) to "Buy Label". Based on the selection (304), integrator (404) responds with a label request (424) to the selected carrier (406) conforming to the multi-carrier API (204) and may include shipping details and expected rate. In one embodiment, a shipment identifier and/or rate identifier is used to link/cross-reference the rating response (418, 419) with the label request (424). The carrier (406) uses the multi-carrier API (204) to form a label response (426) that includes at least one of the following: a tracking number and a label image. The label response is repackaged and/or delivered (428) as a label to merchant (402).

Tracking (308). In sequence (432) the merchant (402) requests the integrator (404) to "Track Package". In one embodiment, the merchant supplies a tracking number, in another embodiment a session is established to allow the merchant to imply the tracking number is from label response sequence (426, 428) conveniently without having to explicitly denote the tracking number. In one embodiment, integrator (404) may determine the carrier (406) from the tracking number, in another embodiment the merchant explicitly denotes the carrier (406). Integrator (404) responds with a track request (434) to the appropriate carrier (406) conforming to the multi-carrier API (204) and may include a tracking number. The carrier (406) uses the multi-carrier API (204) to form a track response (436) that includes at least one of the following: the tracking number and a status. The status is returned as tracking info (438) from integrator (404) to merchant (402).

CARRIER API. The following is an example implementation without limitation of a carrier API (204).

The carrier (406) provides integrator (404) with a master account to be used by integrator's merchants to obtain labels. In one embodiment, the integrator (404) bills merchants (402) on behalf of the carrier (406) for labels purchased by each merchant (402). Alternately, accounts are supported within the carrier API (204) to identify a merchant (402) in API calls so that carrier (406) may bill merchant (402) directly.

Authentication. Two relevant parts with regards to how integrator (404) may authenticate API requests are: an Authorization header, wherein this header authenticates the integrator (404) with a carrier (406), and wherein in one embodiment signature comparison is used to determine authenticity; an AccountToken header, wherein this header identifies the merchant account, in the case of a merchant with an "own carrier" account Authorization header. An example of an Authorization header is one that authenticates the integrator (404) with the carrier (406). In one embodiment, signature comparison is used to determine authenticity.

A sample format is:
Authorization: <hashing algorithm> Credential=<key-id>, SignedHeaders=<comma separated list of headers that were signed>, Signature=<signature>
and an example is:
Authorization: SHIPPO-HMAC-SHA256 Credential=SHIPPOACCESSKEY, SignedHeaders=content-type;host;x-shippo-date, Signature=5d672d79c15b13162d9279b0855cfba6789a8-edb4c82c400e06b5924a6f2b5d7

In one implementation, a secret is generated for the signature verification with the carrier (406) as part of the initial setup process between integrator (404) and carrier (406). In one embodiment, to help implement the authentication easily, the integrator (404) provides sample code in the carrier's preferred programming language. Traditional signing and authenticating REST [Representational state transfer] requests guides may be used for additional technical details on how to compute the signature.

AccountToken header. The AccountToken header identifies the merchant account (402), in the case of "own carrier" account. Any master account requests can ignore this header.

A sample format is:
AccountToken: <account token>
and an example is:
AccountToken: a8edb4c82c400e06b5924a The AccountToken is provided by the carrier (406) for a specific merchant account (402). This token is considered sensitive and should not be exposed in clear text in a UI. An additional account_id field is supported as part of the body requests for Rating and Label purchases, which may be exposed to a merchant (402) in clear text.

Rating. As part of the multi-carrier API (204), the carrier (406) implements the following rating API to allow integrator (404) customers to get a list of available services, prices and transit times. Rates returned by the rating API should be valid for purchases for a given timeframe, for example at least 24 hours. The rating endpoint may be made accessible at a prespecified URL, for example https://<base-url>/<integrator>/services/carrier/rates.

Request elements of the rate request (416) include a set of canonical fields applicable to a majority or all carriers (406). In one embodiment, the request is a rate POST request from the integrator (404) via the multi-carrier API (204), comprises one or more of the following canonical fields in Table 1 (* denotes an important field in Tables 1-8):

TABLE 1

Canonical fields for rate request.

| Element | Type | Description |
|---|---|---|
| account | Account | Credentials and account identification information |
| Account/account_id | string(50) | A unique identifier for this account within the carrier system, e.g. an ID that identifies the merchant. It should not give permission to perform actions in the API by itself as it is not considered secure and may be exposed to the merchant in clear text in our UI. This is provided by the carrier on behalf of one of their merchants and only applies for own accounts. |
| shipment * | Shipment object | Shipment |
| Shipment/shipment_id * | string(5) | Shipment identifier |
| Shipment/shipment_date * | datetime | The datetime the customer wants to ship the item, e.g. in ISO 8601 format |
| Shipment/sender_address * | Address object | Sender address |
| Shipment/recipient_address * | Address object | Recipient address |
| Shipment/delivery_instructions | string(1000) | Special instructions about package delivery |
| Address/name * | string(50) | Name |
| Address/company | string(50) | Company name |
| Address/street1 * | string(50) | Street address line 1 |
| Address/street2 * | string(50) | Street address line 2 |
| Address/city * | string(50) | City |
| Address/state * | string(2) | 2-letter state abbreviation |
| Address/zip * | string(11) | 5-, 9- or 11-digit zip code |
| Address/country * | string(2) | 2-letter country abbreviation |
| Address/email | string(254) | Email address |
| Address/phone | string(15) | Phone number |
| Shipment/parcels * | List of Parcel objects | List of parcels in the shipment |
| Parcel/dimensions * | Dimensions object | Parcel dimensions |
| Dimensions/length * | decimal | Length of parcel |
| Dimensions/width * | decimal | Width of parcel |
| Dimensions/height | decimal | Height of parcel |
| Dimensions/unit * | enum | Dimension units, one of mm, cm, in, ft, m |
| Parcel/weight * | Weight object | Weight of parcel |
| Weight/value * | decimal | Weight value |
| Weight/unit * | enum | Weight unit, one of g, kg, oz, lb |
| is_signature_required * | boolean | True if signature required; otherwise, false |
| service | string(50) | Name of service; if not provided, then rates will be returned for all available services |

The following shows a sample rate request received by the carrier (406) from the integrator (404) via the carrier API (204).

```
JSON
  Copy
{
    "account": {
        "account_id": "af3dea899f1828b494d9568e8336e096"
    },
    "shipment": {
        "shipment_id": "cf6fea899f1848b494d9568e8266e076",
        "shipment_date": "2018-07-27T20:04:35.831Z",
        "sender_address": {
            "city": "San Francisco",
            "country": "US",
            "email": "mrhippo@goshippo.com",
            "name": "Mr Hippo",
            "phone": "4151234567",
            "state": "CA",
            "street1": "965 Mission St",
            "street2": "#572",
            "zip": "94103"
        },
```

```
    "delivery_instructions": "Our buzzer is behind the cactus"
  },
  "recipient_address": {
    "city": "San Jose",
    "country": "US",
    "email": "mrshippo@goshippo.com",
    "name": "Mrs Hippo",
    "phone": "4159876543",
    "state": "CA",
    "street1": "1092 Indian Summer Ct",
    "street2": null,
    "zip": "95122"
  },
  "parcels": [
    {
      "dimensions": {
        "height": "10",
        "length": "10",
        "unit": "in",
        "width": "15"
      },
      "weight": {
        "unit": "lb",
        "value": "1"
      }
    }
  ],
  "is_signature_required": false
},
"service": "Ground"
}
{
  "account": {
    "account_id": "af3dea899f1828b494d9568e8336e096"
  },
  "shipment": {
    "shipment_id": "cf6fea899f1848b494d9568e8266e076",
    "shipment_date": "2018-07-27T20:04:35.831Z",
    "sender_address": {
      "city": "San Francisco",
      "country": "US",
      "email": "mrhippo@goshippo.com",
      "name": "Mr Hippo",
      "phone": "4151234567",
      "state": "CA",
      "street1": "965 Mission St",
      "street2": "#572",
      "zip": "94103"
    },
    "delivery_instructions": "Our buzzer is behind the cactus"
  },
  "recipient_address": {
    "city": "San Jose",
    "country": "US",
    "email": "mrshippo@goshippo.com",
    "name": "Mrs Hippo",
    "phone": "4159876543",
    "state": "CA",
    "street1": "1092 Indian Summer Ct",
    "street2": null,
    "zip": "95122"
  },
  "parcels": [
    {
      "dimensions": {
        "height": "10",
        "length": "10",
        "unit": "in",
        "width": "15"
      },
      "weight": {
        "unit": "lb",
        "value": "1"
      }
    }
  ],
  "is_signature_required": false
},
"service": "Ground"
}
```

Elements of the rating response (416) include a set of canonical fields applicable to a majority or all carriers (406). In one embodiment, the rating response comprises one or more of the following canonical fields in Table 2:

TABLE 2

Canonical fields for rating response

| Element | Type | Description |
| --- | --- | --- |
| account id | string(50) | Account identifier |
| shipment_id * | string(50) | Identifier of the shipment for which rates are returned |
| rates * | list of Rates | List of rates; if no rates are available, then the list may be empty |
| Rate/rate id | string(50) | Identifier of the rate |
| Rate/service * | string(50) | Name of service |
| Rate/amount | decimal | Price of the label |
| Rate/currency * | string(3) | ISO 4217 currency code, always "USD" |
| Rate/eta date | datetime | Estimated arrival time, in ISO 8601 format |
| messages | list of Messages | List of messages; empty list if not applicable |
| Message/code | string(30) | Error Code |
| Message/text | string(100) | User-friendly error message, provided by carrier (406) |

The following shows a sample rating response from the carrier (406) to the integrator (404) via the carrier API (204).
JSON
Copy

```
{
  "account_id": "af3dea899f1828b494d9568e8336e096",
  "shipment_id": "cf6fea899f1848b494d9568e8266e076",
  "rates": [
    {
      "amount": "5.35",
      "currency": "USD",
      "eta_date": "2018-10-14T04:37:17.980Z",
      "rate_id": "5e40ead7cffe4cc1ad45108696162e42",
      "service": "Ground"
    },
    {
      "amount": "11.75",
      "currency": "USD",
      "eta_date": "2018-10-11T04:37:17.980Z",
      "rate_id": "b741b99f95e841639b54272834bc478c",
      "service": "Expedited"
    }
  ],
  "messages": [
    {
      "code": "overnight_service_unavailable",
      "text": "Overnight delivery unavailable"
    }
  ]
}
{
  "account_id": "af3dea899f1828b494d9568e8336e096",
  "shipment_id": "cf6fea899f1848b494d9568e8266e076",
```

```
"rates": [
  {
    "amount": "5.35",
    "currency": "USD",
    "eta_date": "2018-10-14T04:37:17.980Z",
    "rate_id": "5e40ead7cffe4cc1ad45108696162e42",
    "service": "Ground"
  },
  {
    "amount": "11.75",
    "currency": "USD",
    "eta_date": "2018-10-11T04:37:17.980Z",
    "rate_id": "b741b99f95e841639b54272834bc478c",
    "service": "Expedited"
  }
],
"messages": [
  {
    "code": "overnight_service_unavailable",
    "text": "Overnight delivery unavailable"
  }
]
}
```

Label Purchase. As part of the multi-carrier API (204), the carrier (406) implements the following label API to allow integrator (404) customers to purchase a shipping label. The label endpoint may be made accessible at a prespecified URL, for example https://<base-url>/<integrator>/services/carrier/labels.

Request elements of the label request (424) include a set of canonical fields applicable to a majority or all carriers (406). In one embodiment, the request is a label POST request from the integrator (404) via the multi-carrier API (204), comprises one or more of the following canonical fields in Table 3:

TABLE 3

Canonical fields for label request.

| Element | Type | Description |
|---|---|---|
| account | Account | Account identification information (required for own accounts only) |
| shipment * | Shipment | Shipment for which to buy a label (for example, refer to Shipment element in Table 1) |
| Shipment/ delivery_instructions | string(1000) | Special instructions about package delivery |
| image_format * | string(20) | May be one of: PDF_4x6, PNG, ZPLII |
| rate_id | string(50) | Rate for the label, if a rate was previously obtained (within a set time period, for example the last 24 hours) |
| service | string(50) | Name of service |

The following shows a sample label request received by the carrier (406) from the integrator (404) via the carrier API (204).

JSON
Copy
```
{
  "account": {
    "account_id": "af3dea899f1828b494d9568e8336e096"
  },
  "shipment": {
    "shipment_id": "cf6fea899f1848b494d9568e8266e076",
    "shipment_date": "2018-07-27T20:04:35.831Z",
    "sender_address": {
      "city": "San Francisco",
      "country": "US",
      "email": "mrhippo@goshippo.com",
      "name": "Mr Hippo",
      "phone": "4151234567",
      "state": "CA",
      "street1": "965 Mission St",
      "street2": "#572",
      "zip": "94103"
    },
    "recipient_address": {
      "city": "San Jose",
      "country": "US",
      "email": "mrshippo@goshippo.com",
      "name": "Mrs Hippo",
      "phone": "4159876543",
      "state": "CA",
      "street1": "1092 Indian Summer Ct",
      "street2": null,
      "zip": "95122"
    },
    "delivery_instructions": "Our buzzer is behind the cactus",
    "parcels": [
      {
        "dimensions": {
          "height": "10",
          "length": "10",
          "unit": "in",
          "width": "15"
        },
        "weight": {
          "unit": "lb",
          "value": "1"
        }
      }
    ],
    "is signature required": false
  },
  "image_format": "ZPLII",
  "rate id": "5e40ead7cffe4cc1ad45108696162e42",
  "service": "Ground"
}
{
  "account": {
    "account_id": "af3dea899f1828b494d9568e8336e096"
  },
  "shipment": {
    "shipment_id": "cf6fea899f1848b494d9568e8266e076",
    "shipment_date": "2018-07-27T20:04:35.831Z",
    "sender_address": {
      "city": "San Francisco",
      "country": "US",
      "email": "mrhippo@goshippo.com",
      "name": "Mr Hippo",
      "phone": "4151234567",
      "state": "CA",
      "street1": "965 Mission St",
      "street2": "#572",
      "zip": "94103"
    },
    "recipient_address": {
      "city": "San Jose",
      "country": "US",
      "email": "mrshippo@goshippo.com",
      "name": "Mrs Hippo",
      "phone": "4159876543",
      "state": "CA",
      "street1": "1092 Indian Summer Ct",
      "street2": null,
      "zip": "95122"
    },
    "delivery_instructions": "Our buzzer is behind the cactus",
    "parcels": [
      {
        "dimensions": {
          "height": "10",
```

-continued

```
            "length": "10",
            "unit": "in",
            "width": "15"
          },
          "weight": {
            "unit": "lb",
            "value": "1"
          }
        }
      ],
      "is_signature_required": false
    },
    "image_format": "ZPLII",
    "rate_id": "5e40ead7cffe4cclad45108696162e42",
    "service": "Ground"
}
```

Elements of the label response (426) include a set of canonical fields applicable to a majority or all carriers (406). In one embodiment, the rating response comprises one or more of the following canonical fields in Table 4:

TABLE 4

Canonical fields for label response

| Element | Type | Description |
| --- | --- | --- |
| account_id | string(50) | Account identifier |
| label_id * | string(50) | Identifier of the label |
| shipment_id * | string(50) | Identifier of the shipment for which a label is being purchased |
| rate_id | string(50) | Identifier of the rate being purchased |
| service | string(50) | Name of service, if applicable |
| tracking_number * | string(36) | Tracking number for the parcel |
| amount * | decimal | Price of the label |
| currency * | string(3) | ISO 4217 currency code, always "USD" |
| eta_date | datetime | Estimated arrival time, in ISO 8601 format |
| image * | Image | Label image |
| Image/format * | string(20) | Requested image format, for example one of: PDF_4 × 6, PNG, ZPLII |
| Image/content * | string | Base64-encoded image |
| messages | list of Messages | List of messages; empty list if not applicable (for example, refer to Message element in Table 1). |

The following shows a sample label response from the carrier (406) to the integrator (404) via the carrier API (204).
JSON
Copy
```
{
  "account_id": "af3dea899f1828b494d9568e8336e096",
  "label_id": "64bba01845ef40d29374032599f22588",
  "shipment_id": "cf6fea899f1848b494d9568e8266e076",
  "rate_id": "5e40ead7cffe4cc1ad45108696162e42",
  "service": "Ground",
  "tracking_number": "CB150532469US",
  "amount": "5.35",
  "currency": "USD",
  "eta_date": "2018-10-11T04:37:17.980Z",
  "image": {
    "format": "ZPLII",
    "content": "iVBORw0KGgoAAAANSUhEUgAAAI-
      AAACACAYAAADDPmHLAAAABmJLR0QA/
      wD/AP+
      gvaeTAAAACXBIWXMAAC4jAAAuIwF4-
      pT92AAAAB3RJTUUH4QsTEiQFupDJ0AAAIAB
      JREFUeNrtvXec . . . "
  },
  "messages": [ ]
}
{
  "account_id": "af3dea899f1828b494d9568e8336e096",
  "label_id": "64bba01845ef40d29374032599f22588",
  "shipment_id": "cf6fea899f1848b494d9568e8266e076",
  "rate_id": "5e40ead7cffe4cc1ad45108696162e42",
  "service": "Ground",
  "tracking_number": "CB150532469US",
  "amount": "5.35",
  "currency": "USD",
  "eta_date": "2018-10-11T04:37:17.980Z",
  "image": {
    "format": "ZPLII",
    "content":
      "iVBORw0KGgoAAAANSUhEUgAAAIA-
      AAACACAYAAADDPmHLAAAABmJLR0QA/
      wD/AP+
      gvaeTAAAACXBIWXMAAC4jAAAuIwF4-
      pT92AAAAB3RJTUUH4QsTEiQFupDJ0AAAIAB
      JREFUeNrtvXec . . . "
  },
  "messages": [ ]
}
```

Tracking. As part of the multi-carrier API (204), the carrier (406) implements the following tracking API to allow integrator (404) customers to get updates about the status of a shipment. The tracking endpoint may be made accessible at a prespecified URL, for example https://<base-url>/<integrator>/services/carrier/tracks.

Request elements of the track request (434) include a set of canonical fields applicable to a majority or all carriers (406). A tracking request (434) may contain one or multiple tracking numbers. The number of tracking numbers a given endpoint for a given carrier (406) may support per request may be determined during the initial carrier setup. In one embodiment, the request is a tracking POST request from the integrator (404) via the multi-carrier API (204), comprises one or more of the following canonical fields in Table 5:

TABLE 5

Canonical fields for track request

| Element | Type | Description |
| --- | --- | --- |
| tracking_numbers * | list of string(30) | List of tracking number |

The following shows a sample track request received by the carrier (406) from the integrator (404) via the carrier API (204).
JSON
Copy
```
{
  "tracking_numbers":     ["CB150532469US",
    "920559017554776219"]
}
{
  "tracking_numbers":     ["CB150532469US",
    "920559017554776219"]
}
```

Elements of the track response (436) include a set of canonical fields applicable to a majority or all carriers (406). A response time commitment from the carrier (406) may be appropriate to allow for timeouts, for example a response time commitment of three seconds. In one embodiment, the track response comprises one or more of the following canonical fields in Table 6:

TABLE 6

Canonical fields for track response

| Element | Type | Description |
| --- | --- | --- |
| tracking_number * | string(30) | Tracking number |
| eta | datetime | Estimated delivery time |
| status * | string(20) | Current tracking status, one of unknown, pre-transit, transit, delivered, returned, or failure |
| sender_location | Location | Sender location |
| recipient_location | Location | Recipient location |
| tracking_events * | list of Events | List of tracking events; empty if none available |
| Event/status_date * | datetime | Status date, in ISO 8601 format |
| Event/status_code * | string(30) | Tracking Event Code |
| Event/status_details * | string(100) | Status detail |
| Event/location * | Location | Location of parcel |
| Location/city * | string(50) | Tracking event location—city |
| Location/state * | string(2) | Tracking event location—2-letter state abbreviation |
| Location/zip * | string(10) | Tracking event location—5-digit or 9-digit zip code |
| Location/country | string(2) | Tracking event location—2-letter country abbreviation (ISO 3166)—"US" for domestic shipments |
| messages | list of Messages | List of messages; empty list if not applicable (for example refer to Message element in Table 1) |

The following shows a sample track response from the carrier (406) to the integrator (404) via the carrier API (204).

```
JSON
Copy
[
  {
    "tracking_number": "CB150532469US",
    "eta": "2017-11-06T20: 00:00-08:00",
    "status": "transit",
    "recipient_location": {
      "city": "San Francisco",
      "state": "CA",
      "zip": "94103",
      "country": "US"
    },
    "tracking_events": [
      {
        "status_date": "2017-11-03T01: 48:21-06:00",
        "status_code": "package_departed",
        "status_details": "Destination Scan",
        "location": {
          "city": "Cedar Rapids",
          "state": "IA",
          "zip": "52227",
          "country": "US"
        }
      },
      {
        "status_date": "2017-11-06T09: 26:47-08: 00",
        "status_details": "out for delivery",
        "status_details": "Out for Delivery",
        "location": {
          "city": "San Francisco",
          "state": "CA",
          "zip": "94103",
          "country": "US"
        }
      }
    ],
    "messages": [ ]
  },
  {
    "tracking_number": "920559017554776219",
    "status": "unknown",
    "tracking_events": [ ],
    "messages": [ ]
  }
]
[
  {
    "tracking_number": "CB150532469US",
    "eta": "2017-11-06T20: 00:00-08:00",
    "status": "transit",
    "recipient_location": {
      "city": "San Francisco",
      "state": "CA",
      "zip": "94103",
      "country": "US"
    },
    "tracking_events": [
      {
        "status_date": "2017-11-03T01: 48:21-06:00",
        "status_code": "package_departed",
        "status_details": "Destination Scan",
        "location": {
          "city": "Cedar Rapids",
          "state": "IA",
          "zip": "52227",
          "country": "US"
        }
      },
      {
        "status_date": "2017-11-06T09: 26:47-08:00",
        "status_code": "out for delivery",
        "status details": "Out for Delivery",
        "location": {
          "city": "San Francisco",
          "state": "CA",
          "zip": "94103",
          "country": "US"
        }
      }
    ],
    "messages": [ ]
  },
  {
    "tracking_number": "920559017554776219",
    "status": "unknown",
    "tracking_events": [ ],
    "messages": [ ]
  }
]
```

Accounting. In one embodiment, accounting includes billing, or how the customer (402) is billed for all carrier (406) services and the corresponding cash flows.

Label (technology) fees. When a customer (402) uses a shipping label purchased from a carrier (406) via the carrier API (204), the integrator (404) may bill the customer (402). In one embodiment, customers are invoiced, meaning that the customer may not get a single charge per label, but an invoice that aggregates one or more labels and other charges or credits.

Scan-based Labels. By default, labels created through the carrier API (204) may be scan-based, meaning that the integrator (404) charges the customer (402) when the label is used, not when they create the label. In an alternate embodiment, the carrier API (204) supports billing by label creation. The integrator (404) may pass on revenue collected, minus any applicable revenue shares or other fees, to a carrier (406) at a previously agreed upon frequency.

Refunds and Surcharges (post-transaction). Customers may request refunds for labels they have created with the integrator (210, 212). The integrator may pass on refunds to a carrier (406) in near realtime via the carrier API (204), and/or factor in any refunded labels in a next invoice. The integrator (404) may also support carrier (406) surcharges after a label has been created in near realtime via the carrier API (204).

Postage Charges. The integrator supports at least two types of accounts: a Master account meaning that the integrator (404) charges the customer for the postage, and passes on the revenue to the carrier separately; and a "Own account" meaning that the customer (402) has a direct billing relationship with the carrier (406) and the integrator (404) is not necessarily involved in the cashflow. In the case of "own accounts", there may be no billing relationship between the integrator (404) and the carrier (406), and the carrier may be responsible for charging the customer (402) directly for any applicable charges. In this case, the customer (402) only uses the integrator (404) merely for the technical connection to the carrier (406).

Cancellation. In the event labels are not scan-based, or if a carrier (406) may need to provide a way to cancel labels or orders for their customers (402), a cancellation API is provided as part of the carrier API (204). A cancellation endpoint may be made accessible at a prespecified URL, for example https://<base-url>/<integrator>/services/carrier/cancellations.

Request elements of the cancel request include a set of canonical fields applicable to a majority or all carriers (406). A cancel request (434) may contain one or multiple tracking numbers. In one embodiment, the request is a cancel POST request from the integrator (404) via the multi-carrier API (204), comprises one or more of the following canonical fields in Table 7:

TABLE 7

| Canonical fields for cancel request | | |
| --- | --- | --- |
| Element | Type | Description |
| tracking_numbers * | list of string(30) | List of tracking number |

The following shows a sample cancel request received by the carrier (406) from the integrator (404) via the carrier API (204).

JSON
Copy
{
"tracking_numbers": ["036f9238e828474a", "86be265ee2574f6"]
}

Elements of the cancel response include a set of canonical fields applicable to a majority or all carriers (406). In one embodiment, the cancel response comprises one or more of the following canonical fields in Table 8:

| Element | Type | Description |
| --- | --- | --- |
| tracking_number* | string(50) | Tracking Number |
| received_date* | datetime | Datetime the cancellation was acknowledged in the carrier system |
| approved* | boolean | Whether or not the cancellation was approved. |
| status_code | string(50) | Status Code—a result of the cancellation request. |

Possible cancellation status codes include:
Approved—the cancellation request was approved;
Label_already_used—label was already used so it cannot be cancelled;
Label_not_found—label not found for cancellation; and
Cancellation_failed—cancellation request failed for this tracking number.

The following shows a sample cancel response from the carrier (406) to the integrator (404) via the carrier API (204).
JSON
Copy
[{
"tracking_number": "036f9238e828474a",
"received_date": "2017-11-06T20:00:00-08:00",
"approved": true,
"status_code": "approved"
}, {
"tracking_number": "86be265ee2574f6",
"received_date": "2017-11-06T20:00:00-08:00",
"approved": false,
"status_code": "label_already_used"
}]
[{
"tracking_number": "036f9238e828474a",
"received_date": "2017-11-06T20:00:00-08:00",
"approved": true,
"status_code": "approved"
}, {
"tracking_number": "86be265ee2574f6",
"received_date": "2017-11-06T20:00:00-08:00",
"approved": false,
"status_code": "label_already_used"
}]

Carrier Checklist. For a new carrier (406) being set up with integrator (404), a checklist may include:
Live and test base API URLs;
Service definition and estimated transit times;
If applicable, credentials and account IDs for "own accounts";
Integration start date (for example in sandbox environment);
Go live date;
Support email address for integrator (404) customers; and
Support email address for integrator (404) staff.

Error Codes. A canonical set of error codes is useful to communicate issues. The following error codes may clarify communications if a carrier (406) returns errors in any of their API responses, Any invalid or empty error code may be shown as generic_carrier_error to a merchant (402).

In one embodiment, the integrator (404) programmatically maps error codes to user-facing messages, as documented below. In addition to the message, a carrier may be expected to return their own human readable message in their errors. That message may be used for further customer support and debugging purposes.

Rating and Label Errors. Example rate error codes include:

| Code | Message |
| --- | --- |
| account_mismatch_rate_transaction | The selected rate was requested using a different account. Please request a new rate and try again. |
| rate_expired | The given rate is expired and cannot be purchased. Please request a new rate and try again. |

Address Errors. Example address errors include the following, which are documented as errors regarding the address_from, but are available in the same format for the address_to.

| Code | Message |
| --- | --- |
| address_from_not_eligible | The sender address is not eligible. The carrier may not service this address or the requested service is not available at this address. Please update the sender address or choose a different service. |
| address_from_invalid | The sender address is invalid or missing information. Please verify and update the recipient address. |
| address_from_invalid_name | The sender name is invalid or missing. Please verify first and last name contain at least 2 characters. |
| address_from_invalid_company | The company name of the sender address is invalid or missing. Please update the sender company. |
| address_from_invalid_phone | The phone number of the sender address is invalid or missing. Please update the sender phone number. |
| address_from_invalid_street | The street of the sender address is invalid or missing. Please update the sender address. |
| address_from_invalid_city | The city of the sender address is invalid or missing. Please update the sender address. |
| address_from_invalid_state | The state of the sender address is invalid or missing. Please update the sender address. |
| address_from_invalid_zip | The zipcode of the sender address is invalid or missing. Please update the sender address. You can also try removing the last 4 digits of the zip. |
| address_from_invalid_country | The country of the sender address is invalid or missing. Please update the sender address. |
| address_from_mismatch_city_state_zip | The city, state, and zipcode of the sender address do not match. Please update the sender address. |

Parcel Errors. Example parcel errors include the following:

| Code | Message |
| --- | --- |
| parcel_weight_invalid | The weight of the package is invalid or exceeds the maximum weight allowed by the available services. Please update the package weight. |
| parcel_dimensions_invalid | The dimensions of the package are invalid or exceed the maximum dimensions allowed by the available services. Please update the package dimensions. |

Shipment Errors. Example shipment errors include the following:

| Code | Message |
| --- | --- |
| shipment_date_not_eligible | The requested shipment date is not eligible. Please update the shipment date. |
| shipment_exceeds_maximum_parcels | The number of packages in the shipment exceeds the maximum allowed by the carrier. Please try again with fewer packages in the shipment. |

Tracking Errors. Example tracking errors include the following:

| Code | Message |
| --- | --- |
| tracking_number_invalid | The tracking number is missing or invalid. Please try again with a valid tracking number. |

Account Errors. Example shipment errors include the following:

| Code | Message |
| --- | --- |
| carrier_account_invalid_credentials | The carrier account contains invalid credentials. Please update your carrier account with valid credentials. |
| carrier_account_access_denied | There is an issue with your carrier account. Please contact support with the information of your account manager at the carrier and the object ID of this response. |

Tracking Event Codes. A canonical set of tracking event codes is useful to communicate tracking. The following tracking event codes may clarify communications if a carrier (406) returns any in their API responses.

| Status | Status Code | Description |
| --- | --- | --- |
| pre-transit | information_received | Information about the package received. |
| transit | address_issue | There is an issue with the address. Contact carrier to ensure delivery. |
| transit | contact_carrier | Contact carrier for more information. |
| transit | delayed | Delivery of package is delayed. |
| transit | delivery_attempted | Delivery of package has been attempted. Contact carrier to ensure delivery. |
| transit | delivery_rescheduled | Delivery of package has been rescheduled. |
| transit | delivery_scheduled | Package is scheduled for delivery. |
| transit | location_inaccessible | Delivery location inaccessible to carrier. Contact carrier to ensure delivery. |
| transit | notice_left | Carrier left notice during attempted delivery. Follow carrier instructions on notice. |
| transit | out_for_delivery | Package is out for delivery. |
| transit | package_accepted | Package has been accepted into the carrier network for delivery. |
| transit | package_arrived | Package has arrived at an intermediate location in the carrier network. |
| transit | package_damaged | Package has been damaged. Contact carrier for more details. |
| transit | package_departed | Package has departed from an intermediate location in the carrier network. |
| transit | package_forwarded | Package has been forwarded. |
| transit | package_held | Package held at carrier location. Contact carrier for more details. |
| transit | package_processed | Package has been processed at an intermediate location in the carrier network. |
| transit | package_processing | Package is processing at an intermediate location in the carrier network. |
| transit | pickup_available | Package is available for pickup at carrier location. |
| transit | reschedule_delivery | Contact carrier to reschedule delivery. |
| delivered | delivered | Package has been delivered. |
| failure | package_disposed | Package has been disposed. |
| failure | package_lost | Package has been lost. Contact carrier for more details. |
| failure | package_undeliverable | Package is not able to be delivered. Contact carrier for more details. |
| returned | package_unclaimed | Package is unclaimed. Contact carrier for more details. |
| returned | return_to_sender | Package is to be returned to sender. |

Figure 5:
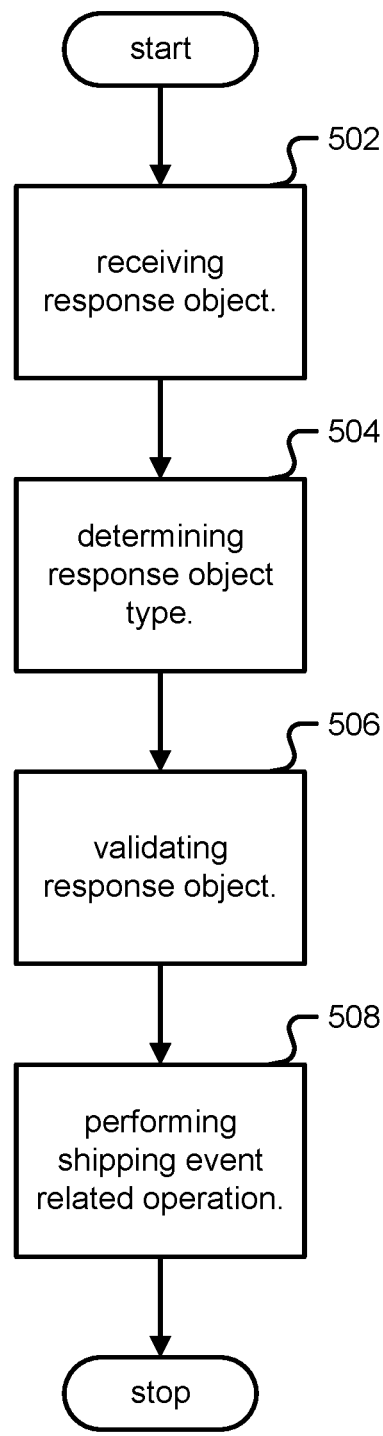
FIG. 5 is a flow chart illustrating an embodiment of a process for multi-carrier shipping.

FIG. 5 is a flow chart illustrating an embodiment of a process for multi-carder shipping. In one embodiment, the process of FIG. 5 is carried on by the system of FIG. 1 and/or integrator (202) of FIG. 2.

In step (502), a response object (418) is received from a carrier (406) that includes a shipment identifier (418) that identifies a shipment uniquely and globally within a multi-carrier shipping service domain. In one embodiment, the carrier is one of a plurality of carriers. In one embodiment, the response object (418) is a rate response object. In one embodiment, the response object (418) is sent from the carrier in response to a request object (416) sent to each carrier of the plurality of carriers.

In step (504) a response object type of the response object (418) is determined. In step (506), the response object is validated, including by determining whether the response object is formatted in a manner associated with the response object type and includes one or more required values associated with the response object type.

In one embodiment, the rate response object (418) includes one or more rates for the shipment. In one embodiment, each rate for the shipment within the rate response object uses the same shipment identifier, for example as described in Table 1. In one embodiment, each shipment has a shipment identifier. In one embodiment, each shipment includes shipment attributes. In one embodiment, shipment attributes include at least one of the following: sender address, recipient address, package dimensions, and package weight, for example as described in Table 1.

In one embodiment, each rate has a rate identifier unique to that rate, for example as described in Table 2. In one embodiment, each rate has a rate identifier unique to that rate and/or the shipment identifier, for example as both described in Table 2. In step (508), a shipping event related operation is performed using data comprising the response object (418) based at least in part on a determination that the response object (418) is formatted in the manner associated with the response object type and includes one or more required values associated with the response object type.

In one embodiment, the rate response object (418) includes rate attributes. In one embodiment, rate attributes includes at least one of the following: service, amount, and estimated arrival time, as described in Table 2. In a step not shown in FIG. 5, a subset of rates is selected. In one embodiment, a subset of rates is displayed to a shipment owner like a merchant (402).

In one embodiment, the subset of rates is dynamically updated over time and the dynamically updated subset of rates is displayed to a shipment owner (402). This dynamic updating may occur periodically at a random or prescribed interval, for example after 24 hours has passed, or may be updated in response to events and/or rules, for example after a snow storm or emergency.

In one embodiment, a selection of a rate is received (422) from the subset of rates. In one embodiment, the selected rate is processed (424). In one embodiment, a label generation request object (424) is sent in response to the selection. In one embodiment, a label response object (426) is received in response to the label generation request. In one embodiment, the response object type includes at least one of the following: label identifier, tracking number, and amount, for example as shown in Table 4. In one embodiment, the response object type includes a plurality of simultaneous requests for one or more shipment owners.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface; and
   a processor coupled to the communication interface and configured to:
   generate a secret for a cryptographic signature verification with a carrier;
   generate an authentication header, wherein the authentication header includes at least one of the following: a cryptographic signature for the cryptographic signature verification and a machine-readable account token;
   send to carrier via the communication interface using a canonical framework a rate request from a customer, at least in part via a rating application programming interface (API) that includes a sender address and a recipient address, and the authentication header;
   receive from the carrier via the communication interface a response object associated with the canonical framework that includes a shipment identifier that identifies a shipment uniquely and globally within a multi-carrier shipping service domain and an error identifier;
   determine a response object type of the response object;
   validate the response object, including by:
      determining whether the response object is formatted in a manner associated with the response object type and includes one or more required values associated with the response object type;
      determining whether the sender address is eligible based at least in part on the error identifier, wherein a given address is not eligible in the event a specific regional carrier does not service the given address or a requested service is not available at the given address; and
      determining whether the recipient address is eligible based at least in part on the error identifier;
   create a physical item label for the carrier for shipping using data comprising the response object based at least in part on a determination that the sender address is eligible, the recipient address is eligible, and the response object is formatted in the manner associated with the response object type and includes one or more required values associated with the response object type, wherein the response object comprises a label image;
   and
   receive from the carrier via the communication interface a tracking response object associated with the canonical framework that includes a tracking number associated with the shipment identifier, a current location for the physical item label, and an estimated time of arrival.

2. The system of claim 1, wherein the carrier is one of a plurality of carriers.

3. The system of claim 2, wherein the response object is a rate response object.

4. The system of claim 3, wherein the response object is sent from the carrier in response to a request object sent to each carrier of the plurality of carriers.

5. The system of claim 3, wherein the rate response object includes zero, one or more rates for the shipment.

6. The system of claim 5, wherein each rate for the shipment within the rate response object uses the same shipment identifier.

7. The system of claim 5, wherein each rate has a rate identifier unique to that rate.

8. The system of claim 5, wherein the rate response object includes rate attributes.

9. The system of claim 8, wherein the rate attributes includes at least one of the following: weight, service, amount, and estimated arrival time.

10. The system of claim 2, wherein the processor is further configured to select a subset of rates.

11. The system of claim 10, wherein the processor is further configured to display a subset of rates.

12. The system of claim 10, wherein the processor is further configured to dynamically update the subset of rates and display the dynamically updated subset of rates to a shipment owner.

13. The system of claim 12, wherein the processor is further configured to receive a further response object in the event a rate is no longer valid.

14. The system of claim 10, wherein the processor is further configured to receive a selection of a rate from the subset of rates.

15. The system of claim 14, wherein the processor is further configured to process the selected rate.

16. The system of claim 10, wherein the processor is further configured to send a label generation request object.

17. The system of claim 16, wherein the processor is further configured to receive a label response object.

18. The system of claim 2, wherein the response object type includes at least one of the following: label identifier, tracking number, and amount.

19. The system of claim 2, wherein the response object type includes multiple simultaneous requests for multiple shipment owners.

20. The system of claim 1, wherein each shipment has a shipment identifier, and includes shipment attributes including at least one of the following: sender address, recipient address, package dimensions, and package weight.

21. The system of claim 1, wherein the label image is in an image format comprising at least one of: PDF_4x6, PNG, and ZPLII.

22. The system of claim 1, wherein the machine-readable account token is not exposed to human readers.

23. The system of claim 1, wherein the response object comprises an empty set of rates in the event a carrier does not service the shipment.

24. The system of claim 1, wherein the processor is further configured to receive a plurality of response objects from a plurality of carriers.

25. A method, comprising:
   generating a secret for a cryptographic signature verification with a carrier;

generating an authentication header, wherein the authentication header includes at least one of the following: a cryptographic signature for the cryptographic signature verification and a machine-readable account token;

sending to the carrier using a canonical framework a rate request from a customer, at least in part via a rating application programming interface (API) that includes a sender address and a recipient address, and the authentication header;

receiving from the carrier a response object associated with the canonical framework that includes a shipment identifier that identifies a shipment uniquely and globally within a multi-carrier shipping service domain and an error identifier;

determining a response object type of the response object;

validating the response object, including by:
  determining whether the response object is formatted in a manner associated with the response object type and includes one or more required values associated with the response object type;
  determining whether the sender address is eligible based at least in part on the error identifier, wherein a given address is not eligible in the event a specific regional carrier does not service the given address or a requested service is not available at the given address; and
  determining whether the recipient address is eligible based at least in part on the error identifier;

creating a physical item label for the carrier for shipping using data comprising the response object based at least in part on a determination that the sender address is eligible, the recipient address is eligible, and the response object is formatted in the manner associated with the response object type and includes one or more required values associated with the response object type, wherein the response object comprises a label image; and receiving from the carrier via the communication interface a tracking response object associated with the canonical framework that includes a tracking number associated with the shipment identifier, a current location for the physical item label, and an estimated time of arrival.

26. A computer program product, the computer program product being embodied in a non-transitory computer readable storage medium and comprising computer instructions for:

generating a secret for a cryptographic signature verification with a carrier;

generating an authentication header, wherein the authentication header includes at least one of the following: a cryptographic signature for the cryptographic signature verification and a machine-readable account token;

sending to the carrier using a canonical framework a rate request from a customer, at least in part via a rating application programming interface (API) that includes a sender address and a recipient address, and the authentication header;

receiving from the carrier a response object associated with the canonical framework that includes a shipment identifier that identifies a shipment uniquely and globally within a multi-carrier shipping service domain and an error identifier;

determining a response object type of the response object;

validating the response object, including by:
  determining whether the response object is formatted in a manner associated with the response object type and includes one or more required values associated with the response object type;
  determining whether the sender address is eligible based at least in part on the error identifier, wherein a given address is not eligible in the event a specific regional carrier does not service the given address or a requested service is not available at the given address; and
  determining whether the recipient address is eligible based at least in part on the error identifier;

creating a physical item label for the carrier for shipping using data comprising the response object based at least in part on a determination that the sender address is eligible, the recipient address is eligible, and the response object is formatted in the manner associated with the response object type and includes one or more required values associated with the response object type, wherein the response object comprises a label image; and receiving from the carrier via the communication interface a tracking response object associated with the canonical framework that includes a tracking number associated with the shipment identifier, a current location for the physical item label, and an estimated time of arrival.

* * * * *